No. 812,809. PATENTED FEB. 20, 1906.
O. BOYER.
CORN SHOCKER.
APPLICATION FILED JULY 5, 1904.

Witnesses
Jas. G. McCathran
H. F. Riley

Oliver Boyer, Inventor
By C. G. Siggers
Attorney

No. 812,809. PATENTED FEB. 20, 1906.
O. BOYER.
CORN SHOCKER.
APPLICATION FILED JULY 5, 1904.
6 SHEETS—SHEET 4.

Fig. 4.

Witnesses
Jas. K. McCathran
H. F. Riley

Oliver Boyer, Inventor
By C. G. Siggers
Attorney

No. 812,809. PATENTED FEB. 20, 1906.
O. BOYER.
CORN SHOCKER.
APPLICATION FILED JULY 5, 1904.
6 SHEETS—SHEET 6.

Oliver Boyer, Inventor

Witnesses
Jas. F. McCathran
T. F. Riley

By C. G. Siggers
Attorney

UNITED STATES PATENT OFFICE.

OLIVER BOYER, OF CONANT, OHIO.

CORN-SHOCKER.

No. 812,809.　　　　Specification of Letters Patent.　　　　Patented Feb. 20, 1906.

Application filed July 5, 1904. Serial No. 215,377.

*To all whom it may concern:*

Be it known that I, OLIVER BOYER, a citizen of the United States, residing at Conant, in the county of Allen and State of Ohio, have invented a new and useful Corn-Shocker, of which the following is a specification.

The invention relates to improvements in corn-shockers.

The object of the present invention is to improve the construction of corn-shockers and to provide a simple and comparatively inexpensive machine adapted to operate on a row of standing corn and capable as it moves forward of cutting the corn and of feeding the same rearward in an upright position and of packing the same in the form of a shock in convenient position for enabling the latter to be readily tied up.

Another object of the invention is to provide a machine of this character which after cutting corn and arranging the same in the form of a shock will enable such shock to be readily deposited upon the ground at one side of the machine in an upright position.

A further object of the invention is to provide a corn-shocker which will be entirely automatic in its operation from the cutting of the corn until the shock is completed and ready to be tied.

The invention also has for its object to provide a corn-shocker having a carrier adapted to transfer the shock from the machine to a point beyond the same and capable when in position on the machine of successive automatic rotation for presenting the different portions of the shock-carrier to the feeding mechanism, whereby the corn after being cut will be transferred to the shock-forming mechanism.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings.

Like numerals of reference designate corresponding parts in all the figures of the drawings.

1 designates the frame of the machine, which may be constructed of any suitable material and which is supported by side wheels 2 and 3 and a rear caster-wheel 4. The caster-wheel 4 is arranged at the center of the back of the frame and is provided with a vertical stem 5, journaled in suitable bearings of a bracket 6. The side wheel 3 is arranged at one corner of the frame and is mounted on the spindle of a stud-axle suitably secured to the frame 1, as clearly shown in Fig. 4 of the drawings. The other side wheel 2, which is larger than the side wheel 3, is mounted in an opening of the frame and is provided with a broad rim to prevent it from sinking in the soft soil, and it may be provided with ordinary projections or spurs to prevent it from slipping. It is mounted on a short axle or shaft, which is journaled in suitable bearings of the frame and which carries a sprocket-wheel 7. The sprocket-wheel 7 receives a sprocket-chain 8, which also meshes with a sprocket-pinion 9 for communicating motion to a transverse shaft 10, from which the machine is operated. The sprocket-pinion 9, which is loosely arranged on the transverse shaft 10, is provided with a clutch-section 11, adapted to interlock with a slidable clutch-section 12. The slidable clutch-section 12, which is connected with the transverse shaft 10 by a key and keyway or any other suitable means, is adapted to be engaged with and disengaged from the clutch-section of the pinion 9 for throwing the machine into and out of operation. The said slidable clutch-section is grooved to receive a shifting lever 13, which is fulcrumed between its ends, as clearly illustrated in Fig. 4 of the drawings. The slidable clutch-section may be spring-actuated, and a ratchet 14 or any other suitable means may be provided for locking the shifting lever in either of its positions.

The supporting-frame, which is preferably composed of longitudinal beams and suitable connecting-pieces, is straight at the front and sides and is curved at the back at 15 to conform generally to the configuration of a rotary support or turn-table 16, which is successively and automatically rotated by the means as hereinafter described to present different portions of a shock carrier and former 17 to the feeding mechanism, whereby the said shock carrier and former will be filled with severed corn. The frame is provided with a platform 18, arranged at one side of the machine and extending across the back of the same for the accommodation of the attendants.

The machine is provided at the front with spaced guides 19, arranged to receive the corn of a row between them as the machine travels forward and consisting of approximately horizontal bottom bars or portions 20 and downwardly and forwardly inclined top portions 21, extending downward from fixed side frames 22 to the front ends of the bottom portions 20 and suitably secured to the same. The inclined top portions of the guides are flanged, as shown, to present smooth surfaces to the standing corn and to protect the feeding mechanism carried by the guides, whereby such feeding mechanism is prevented from becoming clogged. The side frames 22, which are located at opposite sides of the supporting-frame, are approximately inverted-U shaped and consist of upright posts or standards and a connecting top portion 23, which is curved, as clearly illustrated in Fig. 1 of the drawings. The front posts or standards of the side frame are spaced apart at the front of the supporting-frame at opposite sides of the cutting mechanism 24, and the upper ends of the inclined top portions 21 are connected with the front posts or standards, as clearly illustrated in Fig. 2 of the drawings. The cutting mechanism, which may be of any desired construction, is preferably provided with a reciprocating cutter-bar 25, having suitable knives and arranged to coöperate with corresponding knives or blades of a fixed cutter-bar. The reciprocating cutter-bar is provided at one end with a slot 26 to receive a guide-pulley 27; but any other suitable means may be employed for guiding that end of the cutter-bar. The other end of the cutter-bar is connected by a pitman 28 with a crank-wheel 29, having a crank or wrist pin 30 to receive the pitman 28 and keyed or otherwise secured to a short longitudinal shaft 31. The shaft 31, which is journaled in suitable bearings of the supporting-frame, is located in advance of the transverse shaft 10 and is connected at its rear end to the same by bevel-gears 32 and 33, whereby when the machine moves forward and the transverse shaft is rotated the cutting mechanism will be operated.

The standing corn is fed to the cutting mechanism as the machine moves forward by means of upper and lower endless carriers 34 and 35, consisting of sprocket-chains arranged on the end sprocket-wheels and provided at intervals with suitable fingers or projections 36 for engaging the stalks of standing corn. The end sprocket-wheels of the upper and lower endless carriers are mounted on inclined supports 37 and 38, extending longitudinally of the guides 19 and suitably secured to the bottom of the same and to the standards or posts at the front of the side frames. The sprocket-chains are driven by intermediate sprocket-wheels 39 and 40, located at points between the end sprocket-wheels and mounted upon a shaft 42, extending upward from the bottom of each guide, as clearly illustrated in Fig. 2 of the drawings, and composed of sections connected by universal joints 43 and 44. The shaft 42 is provided at its bottom with a sprocket-wheel 45 and is driven by a sprocket-chain 46, extending from the said sprocket-wheel 45 to a sprocket-wheel 47 of a vertical shaft 48. The vertical shaft 48, which is journaled in suitable bearings of the supporting-frame and the adjacent side frame, is connected at its lower end by bevel-gears 49 and 50 with the transverse shaft 10. By this construction motion is communicated from the transverse shaft 10 to the endless carriers of the feeding mechanism.

The endless carriers extend rearwardly some distance beyond the cutting mechanism and are adapted to convey the severed stalks to a point in rear of the supporting-frame, and the said stalks are positively fed rearwardly by upper and lower feeding devices 51 and 52. Each feeding device consists of a plate or member provided at its engaging longitudinal edge with teeth 53 and having a slot 54 at its rear end to receive a guiding-pivot or fastening device 55. The front end of the plate or member is connected with a crank 56, which when rotated reciprocates the feeding device longitudinally and also imparts to the same a transverse oscillatory movement. The teeth 53 are shouldered at their rear ends and are adapted to engage the stalks, whereby the latter will positively feed inwardly or rearwardly. The upper and lower endless carriers and their feeding devices engage the severed stalks at opposite sides and at the upper and lower portions thereof and are adapted to convey the stalks rearwardly in an upright position.

The stalks are fed to the shock former and carrier by a pair of automatically-operating horizontally-movable packing or stowing devices 57, pivotally mounted on the vertical shafts 48, and consisting of horizontally-curved body portions constructed of stout sheet metal or other suitable material and forming guides and provided with arms which are connected with the vertical shafts 48. The arms of the stowing devices are preferably formed by an approximately rectangular frame or piece 58, consisting of a vertical bar having its end portions bent at right angles to form upper and lower arms 59 and 60. The arms 59 and 60 of each stowing device carry a vertical crank-shaft 61, provided with reversely-arranged upper and lower crank-bends 62 and 63, extending in diametrically opposite directions and connected with upper and lower feeding-levers 64 and 65. The feeding-levers are connected between their ends with the crank-bends of the shaft 61, and their rear ends are connected by links 66 and 67 with the frame or bar 58. The front or engaging arms or portions of the levers 64 and 65 extend through upper and lower slots 68 and 69 of the body portion of the stowing device 57, as clearly illustrated in Fig. 8 of the drawings. The links 66 and 67 are pivotally mounted on suitable brackets and are pivotally connected with the rear ends of the feeding-levers. The vertical crank-shaft 61 is provided at its bottom with a sprocket-wheel 70 and is connected by a sprocket-chain 71 with the vertical shaft 48, which has a bottom sprocket-wheel 72 to receive the sprocket-chain. When the upright crank-shaft 61 is rotated, the feeding-levers are moved inwardly and outwardly and oscillated backwardly and forwardly and will carry the stalks into the shock former and carrier, and owing to the reversely-disposed bends of the crank-shaft 61 one of the feeding-levers of each packing device will be in position to actuate or feed the stalks at all times, and a positive feed of the machine is assured.

The shock former and carrier is composed of sections, as hereinafter explained, and the stowing devices are adapted to swing into the spaces or compartments formed by the sections to feed the stalks to the center of the former and carrier, and as the sections or compartments become filled with stalks the oscillatory stowing devices will be forced outward automatically. The rearward or inward feeding of the stalks by the endless carriers and the feeding devices are adapted to swing the stowing devices inward and to hold them at the limit of their inward movement until the said stowing devices are forced outward by the stalks accumulating within the shock former and carrier. When the stowing devices are forced to the outward limit, the shock former and carrier is automatically rotated a quarter of a revolution by the means hereinafter described to bring an empty space or compartment in line with the feeding mechanism. The feeding devices, which are carried by the stowing devices and which are movable independently of the same, are adapted to positively force the material inward as the stowing devices move outward through the accumulation of the material within the shock-former.

The sprocket-chains of the upper and lower endless carriers and the chains for connecting the vertical shafts are provided with suitable tension devices 73, 74, and 75, which may be of any desired construction and which are preferably provided with antifriction devices for directly engaging the chains.

Figure 5:
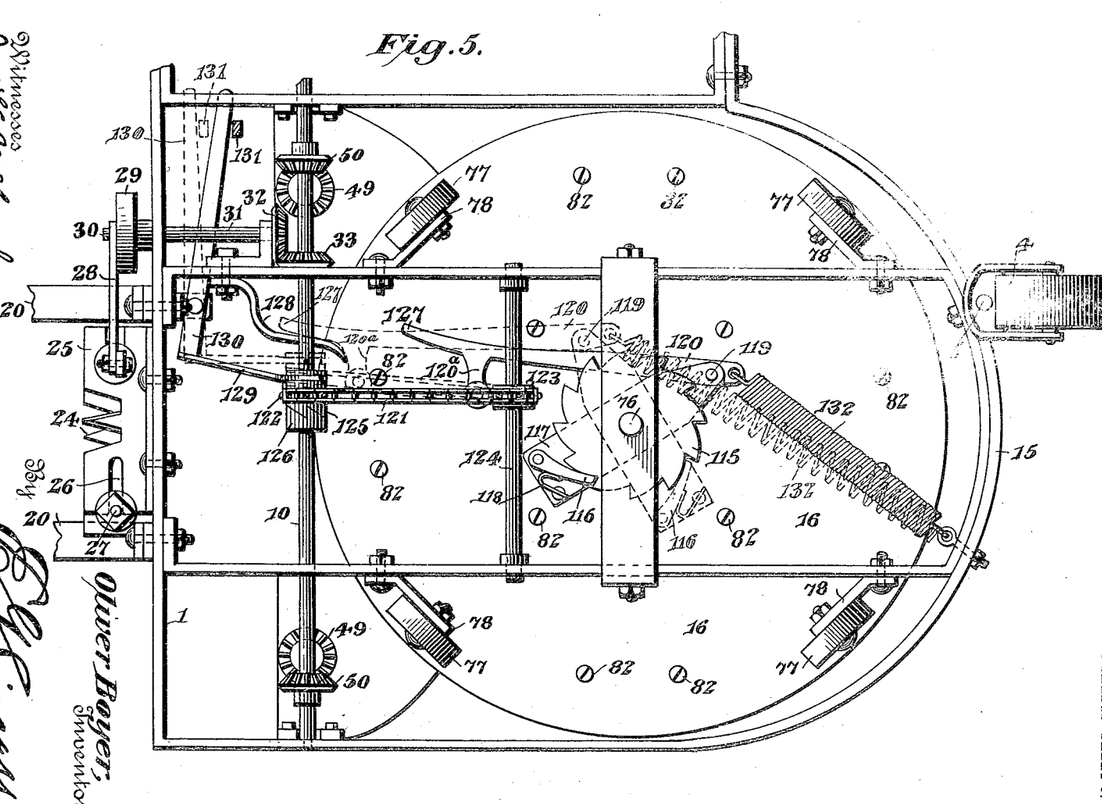
Fig. 5 is an enlarged reverse plan view of the rear portion of the machine, illustrating the construction of the mechanism for successively and automatically rotating the shock-carrier.

The rotary support or turn-table 16, which is circular, is provided with a central depending pivot 76, which is journaled in suitable bearings of upper and lower cross-pieces of the main frame. The main frame is provided with antifriction devices, preferably consisting of rollers 77, arranged to receive the rotary support or turn-table and mounted on suitable brackets 78, as clearly indicated in Fig. 5 of the drawings. These antifriction-wheels are located adjacent to the periphery of the rotary support or turn-table and enable the same to rotate freely.

Figure 4:
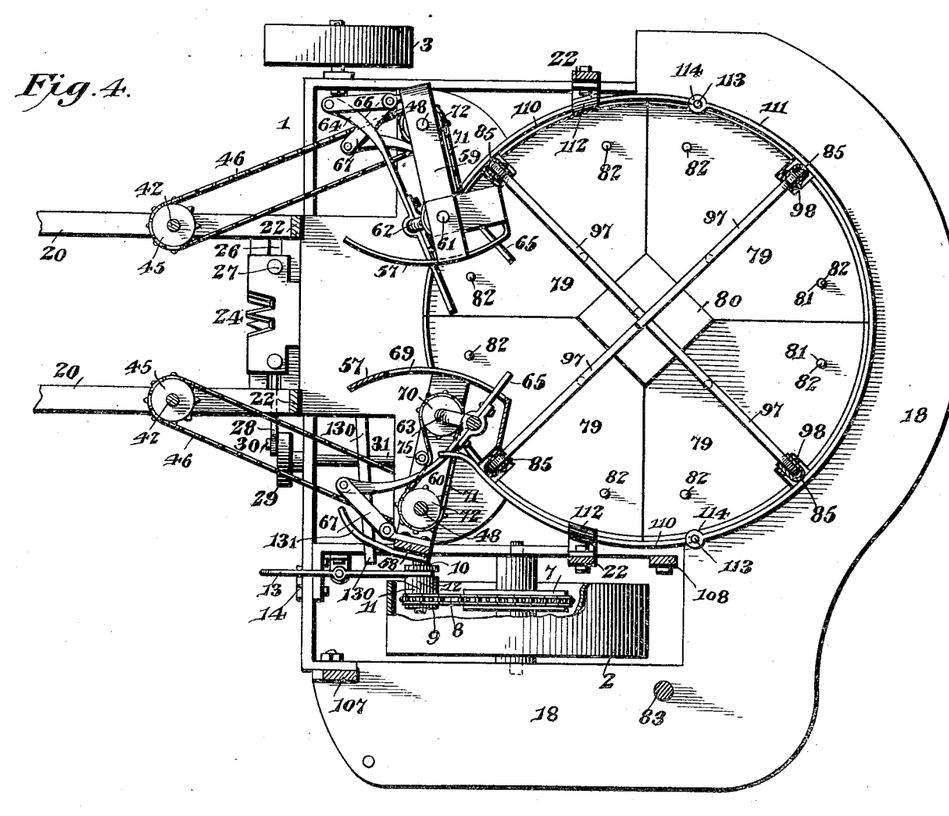
Fig. 4 is an enlarged horizontal sectional view of the rear portion of the machine.
Figures 8, 9, 10:
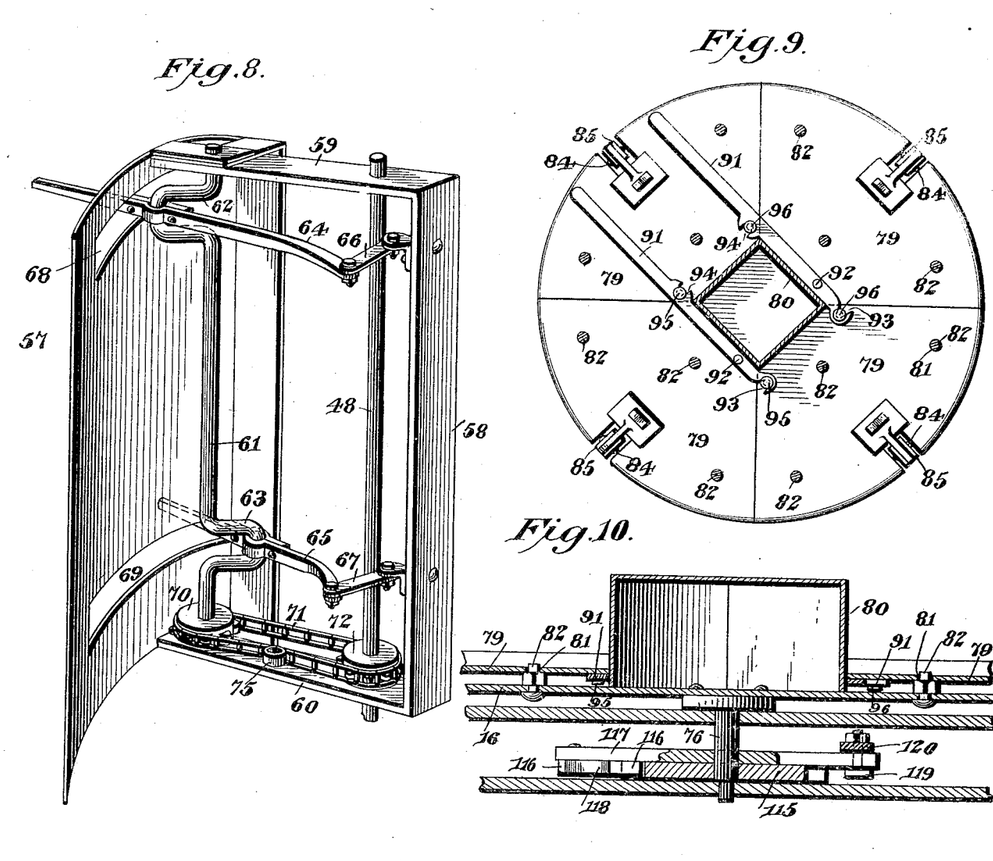
Fig. 8 is a perspective view of one of the oscillatory packers of the feeding mechanism.
Fig. 9 is a horizontal sectional view taken substantially on the line 9 9 of Fig. 2 and illustrating the construction of the sectional bottom of the shock-carrier and the means for locking the sections together.
Fig. 10 is an enlarged detail sectional view illustrating the manner of mounting the rotary support or turn-table on which the shock-carrier is placed.

The shock former and carrier, which is collapsible for discharging the shock, is provided with a sectional bottom, the sections 79 being substantially quadrant-shaped, as clearly shown in Figs. 4 and 9 of the drawings. The inner corners of the sectors or quadrant-shaped sections are truncated to provide a rectangular opening at the center of the bottom of the shock former and carrier for the reception of a projecting rectangular boss or enlargement 80 of the rotary support or turn-table whereby when the sections are secured together in the position shown in Figs. 4 and 9 the bottom of the shock former and carrier will be interlocked with the support or turn-table and held against independent rotary movement. The sections 79 are also provided with perforations 81, arranged at the center of the inner portion of each section and at opposite sides of the outer portion and receiving projections 82, which interlock the bottom of the shock former and carrier with the rotary support or turn-table.

Figure 1:
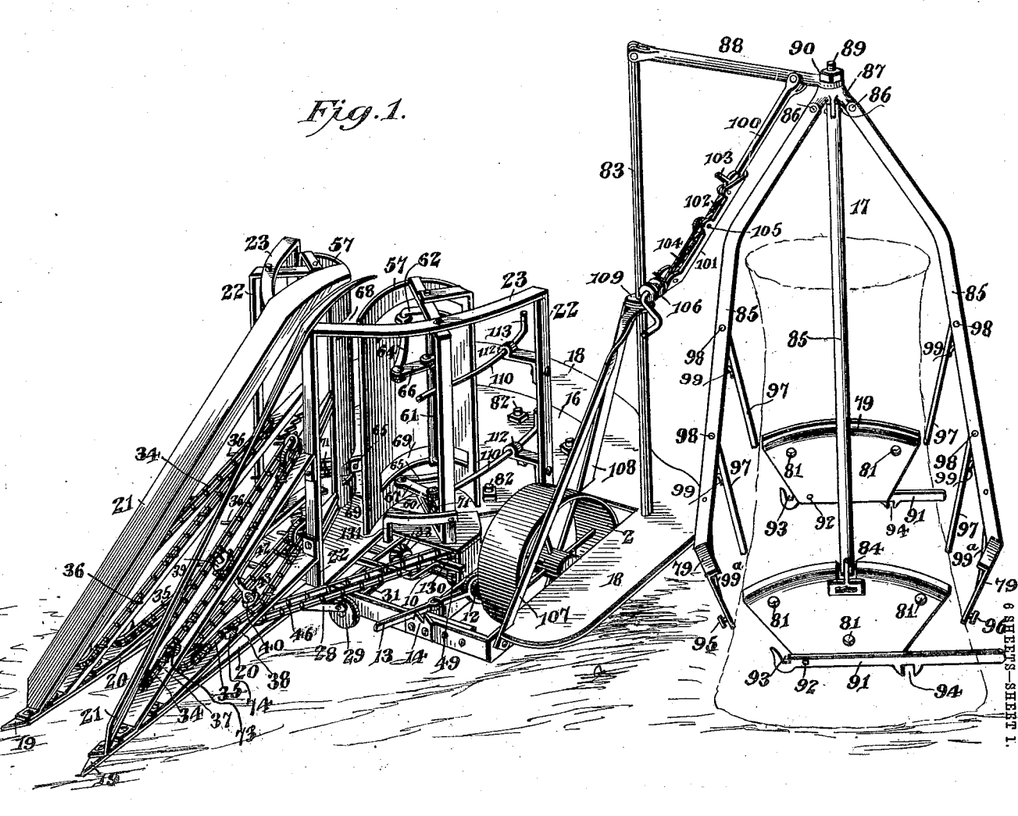
Figure 1 is a perspective view of a corn-shocker constructed in accordance with this invention, the shock-carrier being arranged at one side of the machine for depositing a shock.
Figures 2, 6, 7:
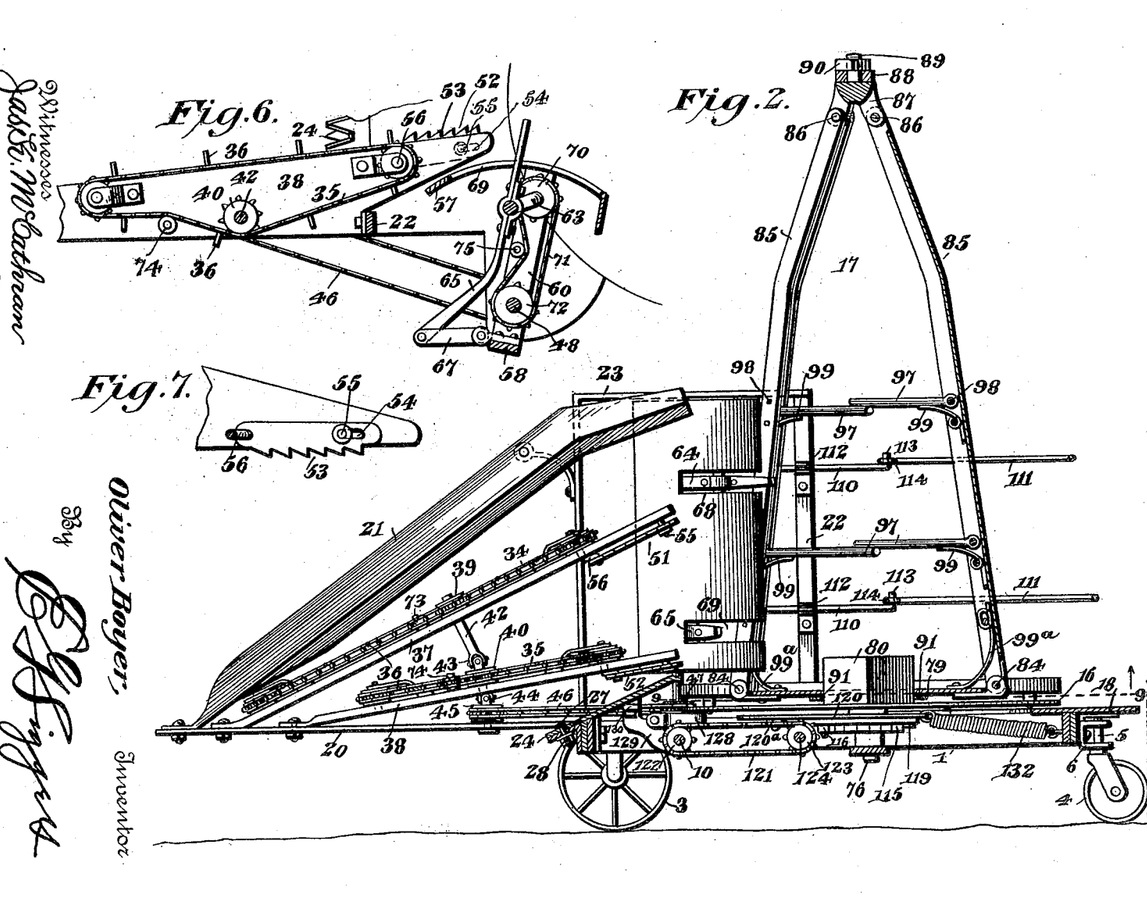
Fig. 2 is a longitudinal sectional view, the shock-carrier being in position on the machine.
Figs. 6 and 7 are detail views illustrating the construction of the feeding mechanism.

The shock former and carrier, which is adapted to be lifted out of engagement with the rotary support or turn-table by a crane 83, as hereinafter explained, is in the form of an upwardly-tapering substantially conical rack, the bottom sections 79 being hinged at 84 to the lower ends of the upwardly-extending side bars 85. The upper ends of the side bars 85 are pivoted by pins or rivets 86 to a head or cap piece 87, which is pivoted to the arm 88 of the crane 83. The head or cap piece is provided with a vertical stem 89, which constitutes the pivot, and the latter extends through an eye or opening of the outer end of the arm 88, being secured to the same by a nut 90, as shown in Figs. 1 and 2 of the drawings.

The sections of the bottom of the shock former and carrier are locked together by a pair of levers 91, pivoted between their ends at 92 on diametrically opposite sections and provided at opposite sides of the pivot with recesses 93 and 94, arranged to engage headed projections or studs 95 and 96 of the adjacent sections of the bottom. The recess 93 is arranged at one end of the lever, which is provided with an extended portion or bill to form a hook. The other recess is formed by a pair of projecting lugs. These recesses are located at opposite edges of the locking-lever, whereby the latter is adapted to be readily swung into and out of engagement with the headed studs or projections. The levers are extended at one end to form handles, and when the shock former and carrier is swung beyond the machine, as illustrated in Fig. 1 of the drawings, the shock is deposited by unlocking the sections of the bottom. The weight of the shock will discharge it from the former and carrier.

The bars 85 of the shock former and carrier are provided with upper and lower stay-rods 97, connected at their outer ends by pivots 98 to the bars 85 and extending inward therefrom toward the center of the shock former and carrier. These stay-rods are radially arranged and divide the shock former and carrier into four spaces or compartments, and they are yieldably supported in a horizontal position by means of springs 99. The stay-rods are adapted to swing downward under the weight of a shock when the same is discharged from the former and carrier, and the springs will automatically return them to a horizontal position when the former and carrier is free from the shock. The bars 85 are preferably substantially U-shaped in cross-section to form longitudinal grooves for the reception of the outer ends of the stay-rods and the springs. Springs 99$^a$ are also provided for yieldably holding the sections of the bottom in a horizontal position. The springs 99 and 99$^a$ may be mounted in any desired manner.

Figures 3, 11:
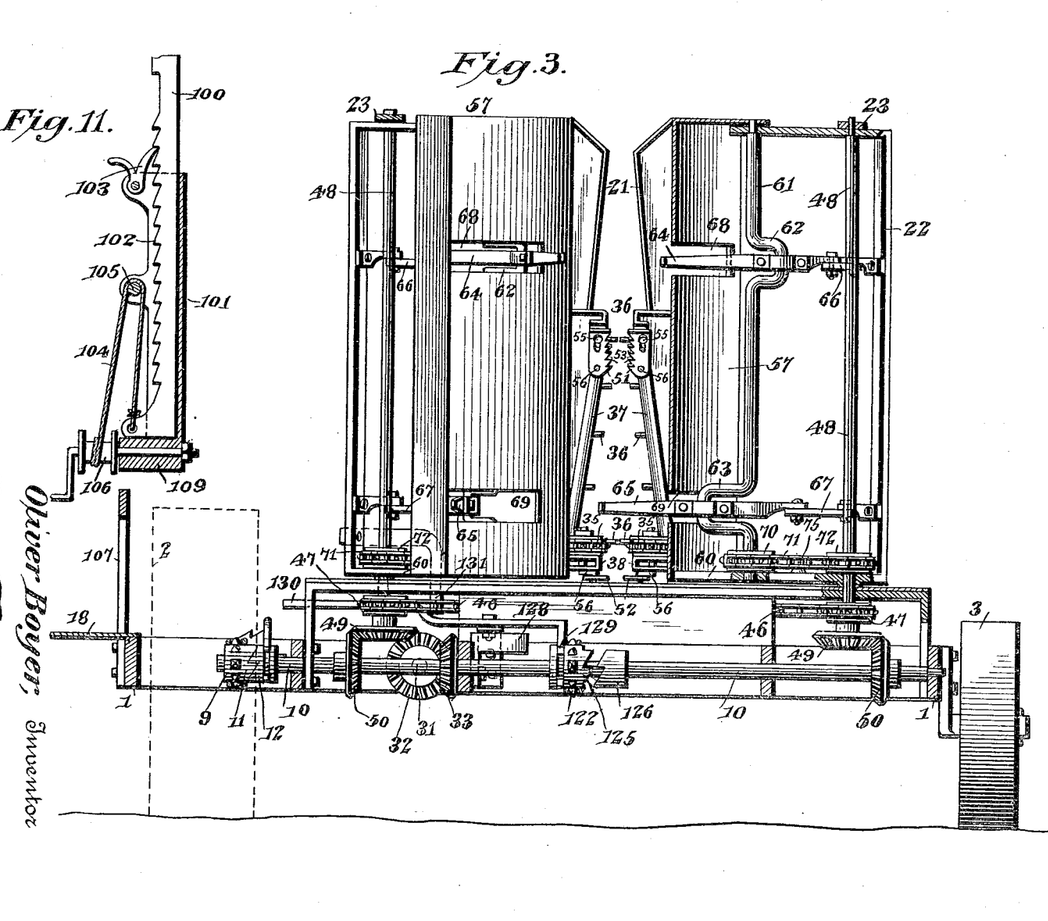
Fig. 3 is a transverse sectional view of the machine, illustrating the construction of the feeding mechanism.
Fig. 11 is a detail view illustrating the construction of the hoisting mechanism of the crane from which the shock-carrier is suspended.

The crane consists of a vertical standard 83 and the arm 88, which is pivoted to the standard and which is supported by an inclined brace composed of two slidable sections 100 and 101. The section 100, which is pivoted at its upper end to the bottom 88, at the outer portion thereof, is provided at its lower portion with ratchet-teeth 102, arranged within the lower section 101 and adapted to be engaged by a pawl 103. The lower section or member of the brace is substantially U-shaped in cross-section to receive the upper section or member, and the pawl 103 is pivoted between the sides of the lower section or member, as clearly illustrated in Fig. 11 of the drawings. The lower end of the section or member is provided with an ear which is connected to one end of a cord 104, extending upward from the ear and around a pulley 105. The pulley 105 is mounted between a pair of ears or flanges of the lower section or member of the brace, and the cord or cable extends downward therefrom to a windlass-shaft 106. The windlass-shaft 106 is mounted on the lower section of the inclined brace, at the bottom thereof, and is adapted to be readily operated to lift the former and carrier clear of the rotary support or turn-table. The pawl 103 will lock the inclined brace in its extended position. The standard of the crane is supported by suitable braces 107 and 108, and the lower end of the standard of the windlass-shaft is journaled in a suitable bearing of a bracket 109. The crane is adapted to be partially rotated to swing the former and carrier from the position illustrated in Fig. 2 of the drawings to that shown in Fig. 1. The braces 107 and 108 are provided at their upper ends with bearings 109 to receive the standard of the crane.

The machine is provided at its sides and back with horizontal guards 110 and 111, arranged at intervals. The guards 110, which are slightly curved, as clearly shown in Fig. 1 of the drawings, are mounted on brackets 112 and have upturned rear ends 113 for the reception of open eyes or hooks 114 of the sections 111, which are approximately semicircular and which are preferably constructed of resilient material. The rear guards are detachable and are removable preparatory to swinging the former and carrier from the machine to a point at one side of the same.

Mounted on the pivot 76 is a horizontal ratchet-wheel 115, located beneath the rotary support or turn-table and adapted to be engaged by an actuating-pawl 116. The actuating-pawl 116 is mounted on one end of an oscillatory plate or member 117, and it is held in engagement with the ratchet-wheel by a spring 118. The plate or member 117 is mounted on the pivot 76, and it extends beyond the ratchet-wheel at diametrically opposite points. The actuating-pawl 116 is arranged at one end of the oscillatory member, and the other end thereof is connected by a pivot 119 to the rear end of a bar 120, which extends forwardly from the oscillatory plate or member to a sprocket-chain 121. The sprocket-chain 121 is arranged on sprocket-wheels 122 and 123, and the bar 120 is provided at its front portion with an arm 120ª, which is secured to one of the flights of the sprocket-chain. The rear sprocket-wheel 123 is mounted on a suitable shaft 124, and the front sprocket-wheel 123 is loosely mounted on the transverse shaft and is provided with a clutch member or section 125, which is adapted to interlock with a fixed clutch section or member 126. The fixed clutch section or member 126 is suitably secured to the transverse shaft 10, and when it is engaged by the movable clutch member 125 motion is communicated from the shaft 10 to the sprocket-gearing, whereby the bar 120 is advanced sufficiently to oscillate the ratchet-wheel, the rotary support or turn-table, and the former and carrier one-quarter of a revolution. The front end 127 of the reciprocating bar or member 120 is set at a slight angle and is arranged to be engaged by a fixed trip 128, which is located in the path of the bar or member 120, and which is adapted to automatically swing the same laterally at the limit of its forward movement, whereby the movable clutch section or member 125 will be automatically disengaged from the fixed clutch section or member 126, thereby stopping the rotary support or turn-table after the same has moved one-quarter of a revolution. The trip 128 consists of a bar or piece secured at its front end to the supporting-frame and having a projecting substantially L-shaped portion, the rear end of which is set at an angle and slightly bent at the end, as clearly shown in Fig. 5 of the drawings.

The front sprocket-wheel 122 is provided at one side with the said clutch section or member 125, and its hub at the opposite side is extended and grooved to receive a fork or bifurcated arm 129 of a shifting lever 130, which has its other arm disposed laterally of the machine at one side thereof and arranged within the path of an approximately L-shaped actuating arm or device 131, mounted on and carried by one of the stowing devices, whereby when a compartment or space of the former and carrier is filled with stalks the shifting lever will be oscillated to throw the sprocket-gearing into operation for partially rotating the said former and carrier. When the clutch members 125 and 126 are separated by the trip 128, the mechanism for actuating the ratchet-wheel is automatically returned to its initial position by means of a coil-spring 132, located in rear of the ratchet-wheel and secured at its outer end to the back of the frame and at its inner end to the rear terminal of the reciprocating bar or member 120.

The machine, which may be drawn by draft-animals or propelled by any suitable means, is automatic in its operation until the shock is completely formed by filling the spaces or compartments of the carrier and former with stalks. The shock is then tied by hand and is deposited on the ground at one side of the machine, as heretofore explained.

Having thus fully described my invention, what I claim as new, and desire to secure by Letters Patent, is—

1. A machine of the class described provided with a shock former and carrier movable toward and from the machine for depositing the shock upon the ground, said shock former and carrier being provided with supporting sides movable outwardly to facilitate the discharge of the shock.

2. A machine of the class described provided with a shock former and carrier movable toward and from the machine for depositing the shock upon the ground, said shock former and carrier being provided with hinged supporting sides arranged to swing outwardly to facilitate the discharge of the shock.

3. A machine of the class described provided with a shock former and carrier movable toward and from the machine for depositing the shock upon the ground, said shock former and carrier having a sectional bottom and provided with hinged sides arranged to swing outwardly.

4. A machine of the class described provided with a shock former and carrier having sides and provided with a sectional bottom carried by and hinged to the sides, and automatic means mounted on the sides and connected with the sections of the bottom for returning the same to a horizontal position.

5. A machine of the class described provided with a shock former and carrier having sides and provided with a sectional bottom carried by and hinged to the sides, and springs connected with the sides and with the sections of the bottom for returning the latter to a horizontal position.

6. A machine of the class described provided with a shock former and carrier composed of upwardly-extending side bars movably connected at the top, and a sectional bottom, the sections of the bottom being connected with the side bars and carried by the same.

7. A machine of the class described provided with a shock former and carrier, comprising upwardly-extending sides pivotally connected at the top, and a bottom composed of sections hinged to the lower ends of the side bars and adapted to swing downward for discharging a shock.

8. A machine of the class described provided with a shock former and carrier having a sectional bottom and provided with movable sides opening outwardly to facilitate the discharge of the shock, and stays dividing the shock former and carrier into separate spaces or compartments and connected at their outer ends to the sides and carried by the same.

9. A machine of the class described provided with a shock former and carrier having a sectional bottom and provided with movable sides opening outwardly to facilitate the discharge of the shock, and stays dividing the shock former and carrier into separate spaces or compartments and hinged at their outer ends to the sides and adapted to swing downwardly.

10. A machine of the class described provided with a shock former and carrier movable toward and from the machine for depositing the shock upon the ground, said shock former and carrier being provided with a sectional bottom and having supporting sides movable outwardly to facilitate the discharge of the shock, each side carrying a section of the bottom.

11. A machine of the class described provided with a shock former and carrier movable toward and from the machine for depositing the shock upon the ground, said shock former and carrier being provided with supporting sides movable outwardly to facilitate the discharge of the shock, and stays dividing the shock former and carrier into separate spaces or compartments and connected at their outer ends to the sides and carried by the same.

12. A machine of the class described provided with a collapsible shock former and carrier, comprising upwardly-converged side bars, a head to which the upper ends of the bars are pivoted, a bottom composed of sections hinged to the lower ends of the bars, and radial stays also pivoted to the bars.

13. A machine of the class described provided with a shock former and carrier having a bottom composed of sections, and a horizontally-swinging locking-lever detachably connecting the sections.

14. A machine of the class described provided with a shock former and carrier having a bottom composed of sections, a locking-lever pivotally mounted on one of the sections and arranged to swing horizontally, and means carried by the adjacent section for engagement with the locking-lever.

15. A machine of the class described provided with a shock former and carrier having a bottom composed of three or more sections, a locking-lever pivoted to one of the sections and provided at opposite sides of the pivot with engaging portions, and studs mounted on the adjacent sections for engagement with the lever.

16. A machine of the class described provided with a shock former and carrier having a bottom composed of three or more sections, locking-levers mounted on the bottom and provided with notches, and headed studs carried by the sections for engagement with the notches of the levers.

17. A machine of the class described provided with a shock former and carrier having a bottom composed of substantially quadrant-shaped sections, and locking-levers fulcrumed on opposite sections and each interlocked with the adjacent sections.

18. A machine of the class described provided with a shock former and carrier having a bottom composed of substantially quadrant-shaped sections, and a pair of locking-levers pivoted between their ends on two opposite sections and each provided at opposite sides of its pivot with means for engaging the two other sections of the bottom.

19. In a machine of the class described, the combination of a shock former and carrier, and a crane comprising a rotary standard, an arm extending from the standard and movable upwardly and downwardly and connected with the former and carrier, an extensible brace composed of sections or members slidable on each other and connected with the arm, means for extending the sections, and locking mechanism for securing the same in their adjustment.

20. In a machine of the class described, the combination of a main frame, a rotary support, a shock former and carrier interlocked with the support, a crane mounted on the main frame adjacent to the support and having a standard and provided with an arm connected with the shock former and carrier, an extensible brace composed of sections slidable on each other and connected respectively with the standard and with the arm, one of the sections being provided with ratchet-teeth, a pawl mounted on the other section for engaging the ratchet-teeth, and hoisting mechanism for extending the sections.

21. In a machine of the class described, the combination of a rotary support having a projecting polygonal portion, and a shock former and carrier provided at its bottom with an opening receiving the said polygonal portion, whereby the shock former and carrier is interlocked with the support.

22. In a machine of the class described, the combination of a rotary support having a projecting portion, and a shock former and carrier provided with a bottom composed of separable truncated sections forming an opening to receive the projections.

23. In a machine of the class described, the combination of a rotary support having a polygonal portion and provided with projections, and a shock former and carrier provided with a bottom composed of truncated sections forming an opening to receive the polygonal portion and having perforations for the reception of the said projections.

24. In a machine of the class described, the combination of a rotary shock-former, means movable in one direction for rotating the shock-former, mechanism for throwing the said means in the opposite direction, gearing for actuating the said means, and means for throwing the gearing out of operation.

25. In a machine of the class described, the combination of a rotary shock-former, a ratchet-wheel connected therewith, means for rotating the ratchet-wheel, gearing for actuating the said means, and means for throwing the gearing into and out of operation.

26. In a machine of the class described, the combination of a rotary shock-former, a ratchet-wheel connected with the former, means embodying a pawl for rotating the ratchet-wheel, gearing for moving the said means in one direction, and a spring for returning the said means to its initial position.

27. In a machine of the class described, the combination of a rotary shock-former, a ratchet-wheel connected therewith, an oscillatory member having a pawl for engaging the ratchet-wheel, gearing for moving the oscillatory member in one direction, and a spring for returning the oscillatory member to its initial position.

28. In a machine of the class described, the combination of a rotary shock-former, a ratchet-wheel, a movable member provided with means for rotating the ratchet-wheel, gearing for actuating the said member, and a trip for throwing the gearing out of operation.

29. In a machine of the class described, the combination of a rotary shock-former, a ratchet-wheel connected therewith, a movable member having means for engaging the ratchet-wheel to rotate the same, gearing embodying a sprocket-chain connected with the said member for actuating the same, and means for throwing the gearing into and out of operation.

30. In a machine of the class described, the combination of a rotary shock-former, a ratchet-wheel connected therewith, means for engaging the ratchet-wheel to rotate the same, gearing embodying a sprocket-chain and a clutch, a reciprocating member connected with the sprocket-chain and with the said means, and a trip arranged in the path of the reciprocating member for operating the clutch to throw the gearing out of operation.

31. In a machine of the class described, the combination of a rotary shock-former, a ratchet-wheel connected therewith, gearing embodying a sprocket-chain and having a clutch, a movable member having means for actuating the ratchet-wheel, a reciprocating bar connected with the movable member and with the sprocket-chain, a trip arranged in the path of the reciprocating bar for operating the clutch to throw the gearing out of operation, and a spring connected with the reciprocating bar for returning the parts to their initial position.

32. In a machine of the class described, the combination of a rotary shock-former, a ratchet-wheel connected therewith, gearing embodying a sprocket-chain and having a clutch, means connected with the sprocket-chain for actuating the ratchet-wheel, a trip arranged in the path of the said means for operating the clutch to throw the gearing out of operation, and a spring connected with the said means for returning the same to its initial position.

33. In a machine of the class described, the combination of a rotary shock-former, a ratchet-wheel connected therewith, gearing embodying a sprocket-chain, means movable in one direction by the sprocket-chain for actuating the sprocket-wheel, a spring for moving the said means in the opposite direction, and means for throwing the gearing into and out of operation.

34. In a machine of the class described, the combination of a rotary shock-former, a ratchet-wheel connected therewith, gearing embodying a clutch and a sprocket-chain, means movable in one direction by the sprocket-chain for rotating the ratchet-wheel, a spring for moving the said means in the opposite direction, a trip arranged in the path of the said means for operating the clutch to throw the gearing out of operation, and shifting mechanism for operating the clutch to throw the gearing into operation.

35. In a machine of the class described, the combination of a rotary shock-former, feeding mechanism, a ratchet-wheel connected with the shock-former, gearing embodying a sprocket-chain and provided with a clutch, means movable in one direction by the sprocket-chain for actuating the ratchet-wheel, a trip arranged in the path of the means for operating the clutch to throw the gearing out of operation, and shifting mechanism operable by the feeding mechanism for throwing the gearing into operation.

36. In a machine of the class described, the combination of a rotary shock-former, means movable in one direction for rotating the shock-former, gearing for actuating the said means, and a trip arranged in the path of the said means for throwing the gearing out of operation.

37. In a machine of the class described, the combination of a rotary shock-former, means movable in one direction for rotating the shock-former, gearing for actuating the said means, a trip arranged in the path of the said means for throwing the gearing out of operation, and a spring for moving the said means in the opposite direction.

38. In a machine of the class described, the combination of a shock-former, and opposite stowing devices having curved guiding portions, and feeding mechanism carried by the stowing devices and movable inwardly and outwardly through slots in the guiding portions.

39. In a machine of the class described, the combination of a rotary shock-former, a stowing device movable into and out of the shock-former and arranged to be moved outward automatically by the material accumulating within the said shock-former, and means operable automatically by the stowing device for rotating the shock-former when the stowing device reaches the limit of its outward movement.

40. In a machine of the class described, the combination of a rotary shock-former, a stowing device movable into and out of the shock-former, and arranged to be moved outward automatically by the material accumulating within the shock-former, gearing for rotating the shock-former, and means carried by the stowing device for automatically throwing the gearing into operation.

41. In a machine of the class described, the combination of a rotary shock-former, a stowing device movable into and out of the shock-former and arranged to be moved outward automatically by the material accumulating within the shock-former, gearing for rotating the shock-former, and a trip for automatically throwing the gearing out of operation when the shock-former has moved a predetermined distance.

42. In a machine of the class described, the combination of a shock-former, a cutting apparatus, means for feeding the plants to the cutting apparatus, a movable stowing device located between the cutting apparatus and the shock-former, a feeding-arm carried by the stowing device, and crank mechanism connected with the feeding-arm for actuating the same independently of the stowing device.

43. In a machine of the class described, the combination of a shock-former, a cutting apparatus, means for feeding the plants to the cutting apparatus, a movable stowing device located between the cutting apparatus and the shock-former, a lever carried by and movable independently of the stowing device, and crank mechanism connected with the lever at a point between the ends thereof for actuating the same.

44. In a machine of the class described, the combination of a shock-former, a cutting apparatus, means for feeding the plants to the cutting apparatus, a movable stowing device located between the cutting apparatus and the shock-former, a feeding-lever carried by and movable independently of the stowing device, a link connected with one end of the feeding-lever, and a crank element connected with the feeding-lever between the ends thereof.

45. In a machine of the class described, the combination of a shock-former, a cutting apparatus, means for feeding the plants to the cutting apparatus, a pivotally-mounted stowing device, feeding-levers mounted on and movable independently of the stowing device, and a shaft having crank-bends connected with the feeding-levers.

46. In a machine of the class described, the combination of a pivotally-mounted stowing device provided with slots, feeding-levers extending through the slots, and a crank-shaft connected with the feeding-levers.

47. In a machine of the class described, the combination of a vertical shaft, a stowing device pivoted by the vertical shaft, feeding mechanism mounted on the stowing device and carried by the same in the movement thereof and also oscillating independently of the said stowing device, and gearing carried by the stowing device and operable by the said vertical shaft for actuating the feeding mechanism.

48. In a machine of the class described, the combination of a vertical shaft, a pivoted stowing device mounted on the shaft, a crank-shaft carried by the stowing device, and feeding-levers connected with the crank-shaft and carried by the stowing device in the movement thereof and also capable of an independent oscillatory movement, and gearing connecting the shafts.

49. In a machine of the class described, the combination of a rotary shock-former having separate spaces or compartments, and stowing means movable into and out of the spaces or compartments and arranged to be forced outwardly by the material accumulating within the shock-former.

50. In a machine of the class described, the combination of a rotary shock-former having separate spaces or compartments, stowing means movable into and out of the spaces or compartments and arranged to be forced outwardly by the material accumulating within the shock-former, and means operable by the said stowing means at the limit of the outward movement thereof for rotating the shock-former.

51. In a machine of the class described, the combination with a shock-former having compartments or spaces, and stowing means movable into and out of the compartments or spaces and arranged to be forced outward automatically by the material accumulating within the shock-former, said stowing means being also arranged to be moved inward automatically into an empty space or compartment by the material.

52. In a machine of the class described, the combination with a shock-former having compartments or spaces, stowing means movable into and out of the compartments or spaces and arranged to be forced outward automatically by the material accumulating within the shock-former, said stowing means being also arranged to be moved inward automatically into an empty space or compartment by the material, and means operable by the said stowing means at the limit of its outward movement for partially rotating the shock-former to present the spaces or compartments successively for filling.

53. In a machine of the class described, the combination of a shock-former, stowing means movable into and out of the shock-former and arranged to be forced outwardly by the material accumulating within the shock-former, and feeding means carried by the stowing means in the movement thereof and movable independently of the same.

54. In a machine of the class described, the combination with a shock-former, of a horizontally-swinging stowing device movable into and out of the shock-former and arranged to be forced outward automatically by the material accumulating within the shock-former, and feeding devices carried by the stowing devices in the inward and outward movements thereof and movable independently of the same, whereby the material is forced inwardly as the packers move outwardly.

55. In a machine of the class described, the combination with a shock-former, of a stowing device movable toward and from the shock-former and arranged to be forced outwardly by the material accumulating within the machine, and oscillatory feeding means carried by the stowing device and movable independently thereof, whereby it is adapted to force the material inwardly as the stowing device moves outwardly.

56. In a machine of the class described, the combination with a shock-former, of a stowing device movable into and out of the same and arranged to be forced outwardly by the material accumulating within the shock-former, and feeding means carried by the stowing device and movable independently thereof, whereby it is adapted to force the material inwardly as the stowing device moves outwardly.

57. In a machine of the class described, the combination with a shock-former having sector-shaped spaces or compartments, of oppositely-disposed horizontally-swinging stowing devices movable into and out of the compartments of the shock-former and arranged to be forced outwardly by the material accumulating within the same, said stowing devices being provided with curved guiding portions for engaging the material, and means mounted on the stowing devices for moving the material inwardly as the stowing devices move outwardly.

In testimony that I claim the foregoing as my own I have hereto affixed my signature in the presence of two witnesses.

OLIVER BOYER.

Witnesses:
  R. R. KENNEDY,
  SMITH MCFARLAND.